J. P. BALL.
SYSTEM OF SEPARATING SEWAGE.
APPLICATION FILED JULY 21, 1913.
1,154,597.
Patented Sept. 28, 1915.
3 SHEETS—SHEET 1.
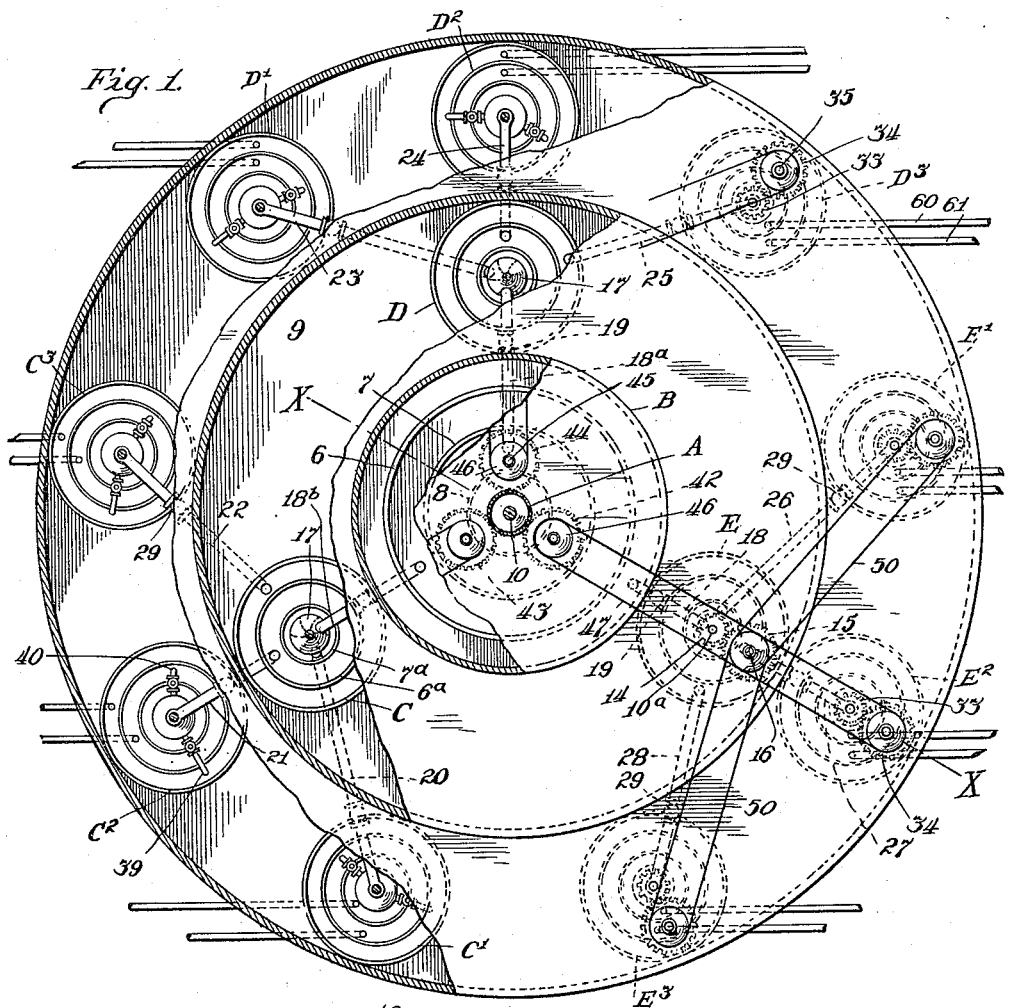
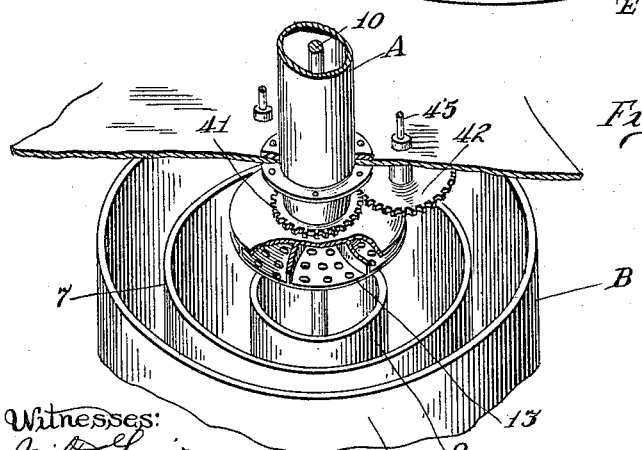
Witnesses:
Milton Lenoir
A. E. Wighton
Inventor:
John P. Ball
Heidman & Street
Attorneys.

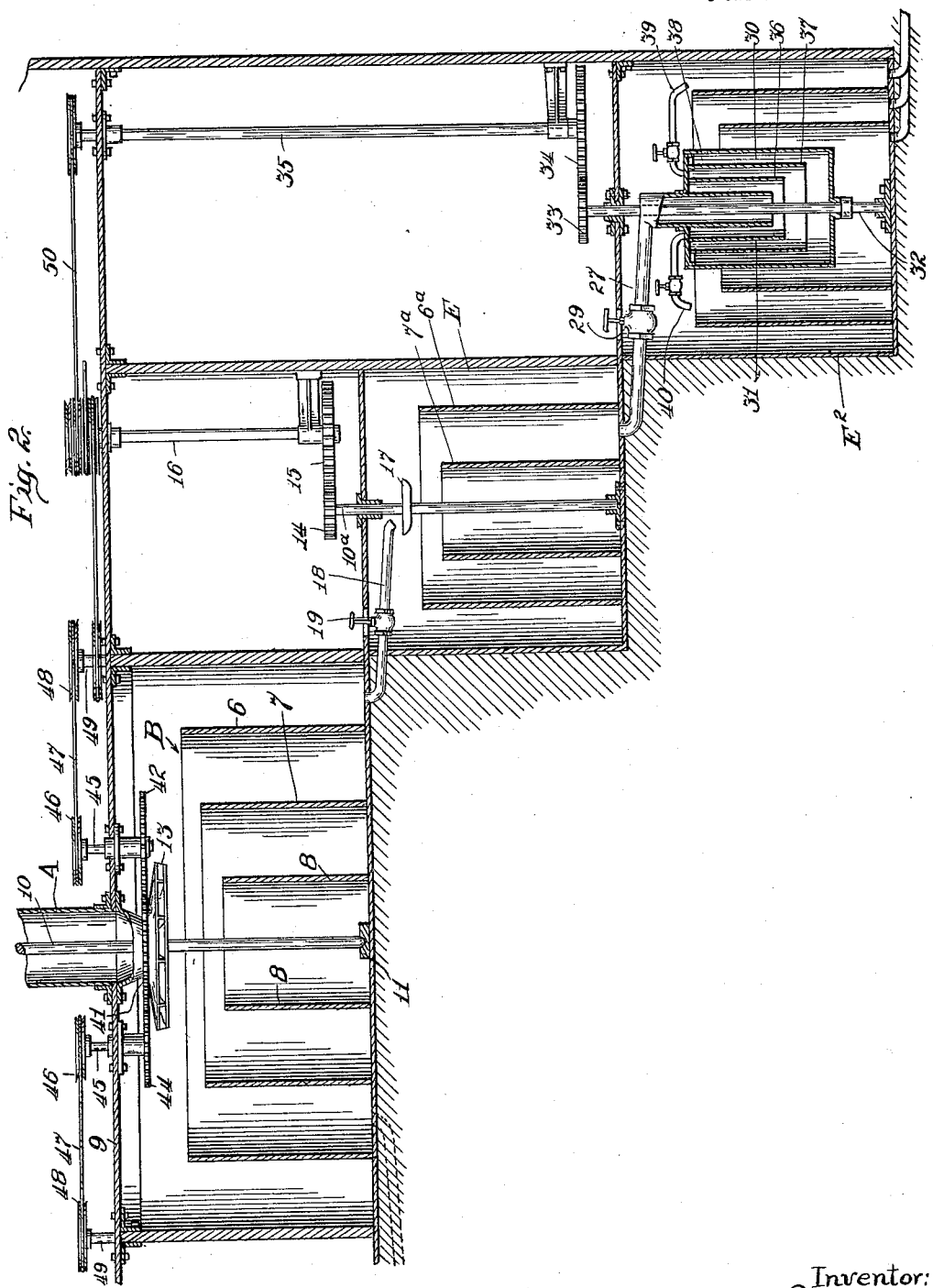

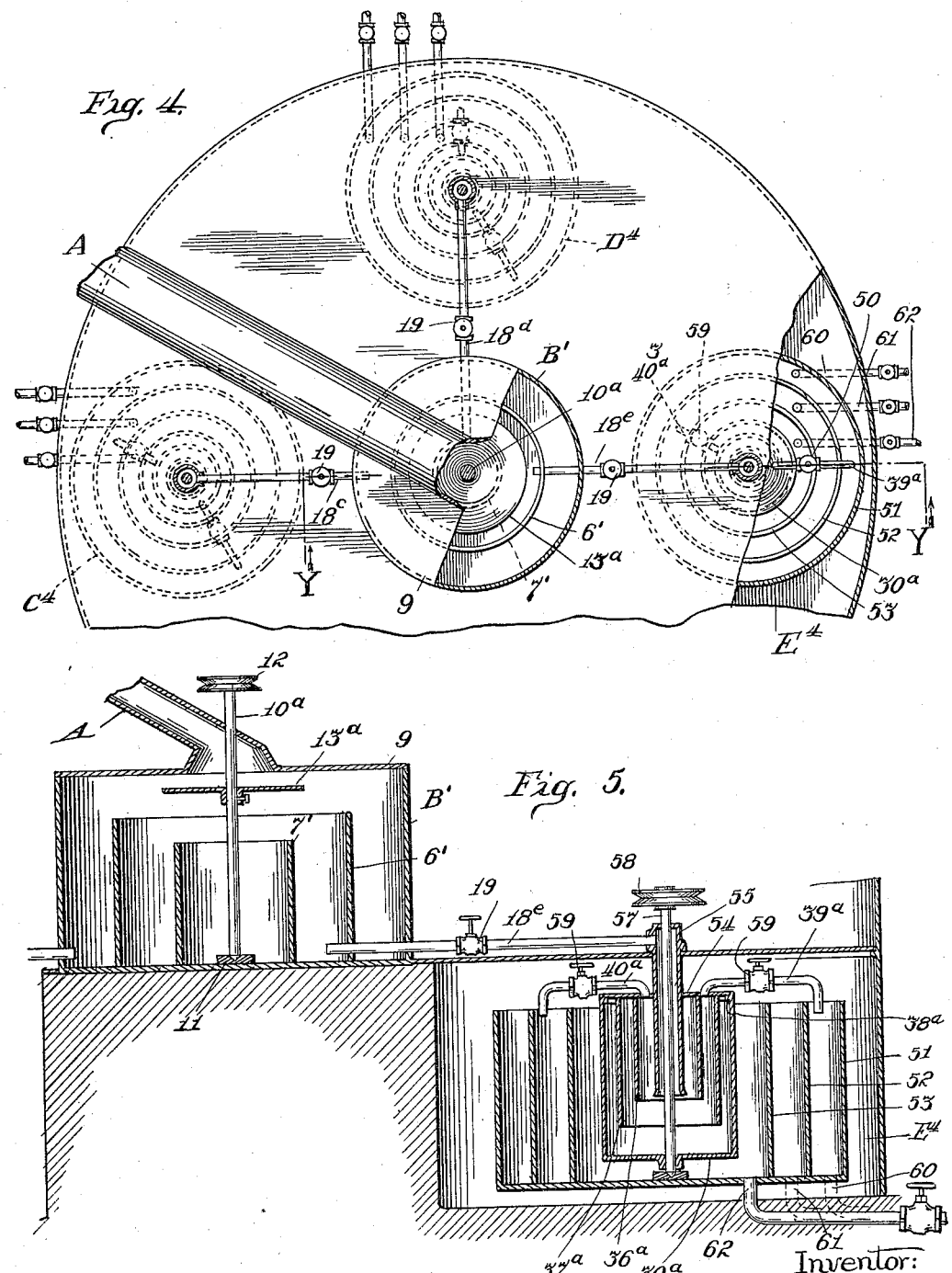

UNITED STATES PATENT OFFICE.

JOHN P. BALL, OF CHICAGO, ILLINOIS.

SYSTEM OF SEPARATING SEWAGE.

1,154,597.  Specification of Letters Patent.  Patented Sept. 28, 1915.

Application filed July 21, 1913. Serial No. 780,116.

*To all whom it may concern:*

Be it known that I, JOHN P. BALL, a citizen of the United States, and resident of Chicago, in the county of Cook and State of Illinois, have invented a certain new and useful System of Separating Sewage, of which the following is a description, reference being had to the accompanying drawings, which form a part of my specification.

My invention relates to a system of separating and grading of sewage, whereby the heavier particles will be separated from the lighter; having for its object the provision of means which may be operated by power obtained from any suitable source, centrifugal force being utilized for the disintegration or separation of the sewage, separating and confining the particles of sewage of different specific gravities whereby a portion of the sewage, such as grease, acids, and the like may be held in suspension, and the various portions of the sewage treated and handled as may be desired; the system contemplating a series of revolving elements and chambers connected in series, so that the initial separation or disintegration may be subjected to the action of the succeeding members or elements of the system, so that the various separated portions of sewage will again be separately treated or disintegrated as will more fully appear from the following detailed description.

In the drawings: Figure 1 is a top plan view of the preferred form of my system, portions of the top or covering means being shown broken away. Fig. 2 is a vertical sectional view taken on the line X—X of Fig. 1. Fig. 3 is a perspective view, looking downward, of the central or initial sewage receiving member or basin. Fig. 4 is a top plan view of a modified form of my improved system; certain portions of the tops or covering members being shown broken away in order to more clearly illustrate the internal construction. Fig. 5 is a vertical cross sectional view taken on the line Y—Y of Fig. 4, and looking in the direction of the arrows.

In the particular exemplification of my invention as illustrated in the drawings, the sewage is conveyed to the mechanism through the sewer or conduit A, the outlet or discharge end whereof is merely illustrated, it being understood, of course, that my system contemplates means preferably located at a lower level than the outlet of the sewer or conduit so that the sewage may flow readily into the device and the sewage or hydraulic head used to operate the various mechanisms or portions of my system if so desired.

The conduit or sewer A connects with a suitable basin or pit B which is preferably provided with a series of concentric cylindrical partitions 6, 7, and 8, shown of different heights, see Fig. 2, so that the basin or pit interior will be divided into concentrically arranged compartments having communication with each other merely at the upper part of the pit or basin B. The walls and bottom of the pit or basin B, as well as the concentric partitions 6, 7, and 8, may be composed of any suitable material such as brick, concrete, and the like; while the top of the basin or pit may be provided with a cover 9 which may be made removable, or merely a portion thereof, so that access to the respective compartments may be had. The cover 9 may also be employed to support the sewer outlet and various operating elements hereinafter to be described.

Concentrically mounted in the pit or basin B, and preferably at a point concentric with the axis of the sewer outlet or orifice, I provide a shaft 10 having suitable bearings as for example at 11 in the bottom of the pit, as shown in Figs. 2 and 5, while the upper portion of the shaft in Fig. 5 is also shown provided with a belt-receiving pulley or wheel 12 which latter is driven by any suitable motive power, so that the shaft 10 may be evolved at the desired speed if other power, other than that derived from the sewage head, is employed. The upper end of the shaft 10 may be provided with suitable bearings in the wall of the conduit A as will be readily understood from the constructions illustrated.

The shaft 10 is provided with a gyrator or outwardly discharging turbine wheel 13 at the orifice or immediately beneath the orifice of the sewer or conduit A, as clearly shown in Figs. 2 and 3; the turbine wheel having the usual vanes or curved ribs so that the central feeding of sewage thereto will not only induce its rapid rotation, but also induce the disintegration or separation of the particles of sewage of different specific gravities through the action of the rapidly rotating turbine wheel. The rotating wheel 13 will cause the heavier particles to be thrown into the outer compartment intermediate of the outer wall of basin or pit B and the partition 6, while the lighter particles will be thrown into the compartments intermediate of partitions 6, 7, and 8. The partitions 6, 7, and 8 may be made of different heights as shown, thus permitting the lighter substances or liquid, should the compartments become filled, to overflow into the compartment or chamber containing the lighter material; partition 6 being also of a height sufficient to intercept such lighter particles as may be thrown or partially carried by the heavier particles; and the extremely light or liquid portion of the sewage may be allowed to pass through perforations near the axis of the gyrator or turbine 13 into the central compartment formed by partition 8. The pit or basin B, in which the initial separation or disintegration takes place, is located at a higher level or different horizontal plane than are the additional separators or chambers now to be described.

My improved system in its preferred adaptation contemplates a number of separating elements or basins arranged in series; the intermediate elements or basins corresponding in number with the number of compartments or chambers in the initial separator B; with each element or basin communicating with or receiving from a separate compartment of the initial basin or element B. As the separator B is provided with three compartments, I show three intermediate or subsidiary elements or basins C, D, and E, which in turn are each provided with three chambers or compartments produced by the inner-partitions $6^a$ and $7^a$, see Fig. 2; the construction and arrangement of the three subsidiary basins C, D, and E, being indentical. The separating elements C, D, and E, of the system as illustrated in Figs. 1 and 2, are all located preferably beneath the plane of the bottom of the basin or pit B.

The separating elements or pits C, D, and E may be composed of any suitable material such as brick, concrete, and the like, and provided with the chambers, as previously described, corresponding in number with the chambers or compartments of basin or pit B. Each of the three pits or basins C, D, and E is provided with a centrally located revoluble shaft $10^a$, having suitable bearings in the bottom of the pits, with the upper ends of the shaft $10^a$ provided with any suitable driving mechanism, as for example gearing 14, which in turn is driven by gear 15 secured at the lower end of revoluble shaft 16 suitably mounted in the pit and above the basins C, D, and E; it being understood that each of the intermediate basins C, D, and E, is provided with a shaft similar to the shaft $10^a$ shown in Fig. 2, having gearing at the upper end, with a similar shaft 16 located adjacent to each intermediate basin, as can be seen from Fig. 1.

The revoluble shaft $10^a$ of each intermediate basin is provided with a saucer shaped member 17 adapted to receive the material resulting from the initial separation in initial tank or basin B. The basins C, D, and E receive separated sewage from different compartments in basin B; for example basin E, in Fig. 2, receives the separated sewage by means of pipe 18 from the outer compartment or chamber of basin B, while basin D receives separated sewage from the compartment between walls 7 and 8 of basin B by means of conduit $18^a$, shown in dotted lines in Fig. 1, and basin C receives separated sewage from the intermediate compartment of basin B by means of conduit $18^b$, see Fig. 1; the various conduits leading from basin B being preferably provided with valves as shown at 19, see Fig. 2, whereby the flow from basin B to the intermediate basins may be controlled or shut off.

It is evident from the construction just described that the initially separated sewage, or portions of different specific gravity, is again independently treated or rather subjected to further separation by means of the rapidly rotating saucer shaped plate 17 onto which the conduits 18, $18^a$ and $18^b$ discharge. The rapid rotation of saucer member 17 tends to further separate, by centrifugal force, the portion discharged therein from basin B by means of the conduits.

In the form of the system as illustrated in Fig. 1, I provide another or third lot of separating elements or basins, preferably arranged in a plane beneath the bottoms of the intermediate basins C, D, and E, and composed of nine separating elements arranged in three series; the series comprising three elements for each intermediate element. As shown in Fig. 1, the intermediate basins C, D, and E are each connected to a series of final separating elements composed of the basins $C^1$, $C^2$, and $C^3$, which are connected with the three separate chambers of basin C; basins $D^1$, $D^2$, and $D^3$, connected with separate chambers of basin D, and basins $E^1$, $E^2$, and $E^3$ connected with the three separate chambers of basin E. As I have chosen to illustrate the intermediate basins C, D, and E with three chambers, I therefore, prefer to employ a final series consisting of three basins or elements to correspond therewith. In referring to Fig. 1, it will be seen that basin or element $C^1$ receives material from the inner chamber or compartment of basin C by means of the conduit 20, basin or element $C^2$ receives material from the intermediate compartment of basin C by means of conduit 21; basin C³ receives material from the outer compartment of basin C, by means of conduit 22. Basin D¹ receives material from the inner chamber of basin D by means of conduit 23, basin D² receives material from the intermediate compartment of basin D by means of conduit 24, and basin D³ receives material from the outer compartment of basin D by means of conduit 25. Basin E¹ receives material from the inner compartment of basin E by means of conduit 26; basin E² receives material from the intermediate compartment of basin E by means of conduit 27, and basin E³ receives material from the outer compartment of basin E by means of conduit 28. It will be understood, of course, that all of the conduits just referred to are preferably provided with shut-off valves or cocks as indicated at 29, more clearly shown in Fig. 2. The final pits or basins are also shown divided into separate chambers or compartments by means of the partitions or walls 6ᵇ and 7ᵇ; while the material conveyed through the conduits from the intermediate basins is preferably discharged into cylindrical sheet iron drums or circular tanks 30 provided with closed tops, as more clearly shown in Fig. 2, and provided with the downwardly extending baffle member or partition 31 whereby the material entering the drums or circular tanks is compelled to flow toward the bottom of the tanks or drums. These circular tanks or drums are mounted on revoluble shafts as shown at 32, having suitable bearings in the pits or basins, with the upper ends of the shafts shown provided with gearing as at 33 which meshes with gearing 34 secured at the lower end of a shaft as shown at 35 in Fig. 2, which shaft or shafts are rotated by any suitable means. The tanks are also provided with depending partitions or walls 36 and 37 as shown in Fig. 2, whereby the tanks are divided into a number of compartments connected at the bottom; the walls depending to different extents as shown, with the wall 36 shorter than the wall 37 which is intermediate of the wall 36 and the outer wall of the tank, so that the lighter material will rise between baffle member 31 and wall 36, while the somewhat heavier material will rise or crowd upward between walls 36 and 37, and the very heavy material will, by action of centrifugal force, crowd up adjacent the outer wall of the basin or drum. As all of the final basins of the system as illustrated in Fig. 1 are similar in construction and operation, the disclosure made in Fig. 2 together with the description of a single basin or tank will suffice. In Fig. 2, the material from the intermediate chamber of basin E is discharged into the drum or tank 30 by the feed pipe or conduit 27 and by reason of baffle member 31 is compelled to flow toward the bottom of the tank or cylindrical drum, with the action of centrifugal force tending to move the matter as previously stated; it being understood that the tank 30 revolves with the shaft 32.

The tanks 30 are provided with outlets or conduits, corresponding in number with the chambers with which the tanks or drums are provided; for example the tank or drum as shown in Fig. 2, is provided with two walls or partitions 36 and 37, whereby the tank or drum interior is divided into three chambers or compartments. These outlets or conduits are indicated in Fig. 2, where the tank is shown provided with three compartments, by the reference characters 38, 39, and 40; the outlet 38 communicating with the upper end of the outer compartment discharges into the compartment formed by the inner wall or partition; conduit 39 discharges from the intermediate compartment or chamber of the tank and into the outer chamber of the element or basin; while conduit 40 discharges from the inner compartment of the drum or cylinder and into the intermediate chamber formed by concentric partitions or walls of the element or basin E² as shown in Fig. 2; the conduits being preferably arranged so as to control the flow therethrough. All of the final elements or tanks are provided with a series of take-off or drain-pipes similar to 38, 39, and 40, whereby the finally treated or disintegrated sewage may be discharged from the respective compartments of the last series of elements.

The shaft 10 of the system illustrated in Figs. 1 and 2 may be driven in any suitable manner. The shaft 10 is shown provided with a gear 41 which meshes with gears 42, 43 and 44; the gears 42, 43, and 44 being mounted on suitable shafts 45, identical in construction and mounting, which are provided with suitable pulleys as at 46 to receive belts 47 which take about pulleys 48 mounted on the shafts 49 whereby the different intermediate elements or basins C, D, and E are operated; the shafts 49 being geared in any suitable manner to the power shafts 10ᵃ of the intermediate basins or elements, as for example by the gearing 14 and 15 and shaft 16 as shown in Fig. 2; the shaft 16 by means of belt and pulley connection as shown at 50 in Fig. 2 transmitting power to the shaft 35, which latter transmits power to the drum 30 by means of gearing 33 and 34. It will be understood, of course, that the method of transmitting power to all of the elements of the final series may be identical with that just described.

In Figs. 4 and 5, I show a modified form of my invention wherein the third series of elements shown in Figs. 1 and 2 are omitted; the construction or system, however, in other respects being substantially identical with that previously described and shown in the previous figures. In this construction, the basin B' is provided with the circular inner walls or partitions 6' and 7' with the sewage discharging by conduit A onto a turbine 13$^a$, as shown in Figs. 1 and 2, while the shaft 10$^a$ is shown differently mounted and provided with pulley 12. The tank B' is also provided with three compartments and, therefore, I provide three auxiliary basins or elements C$^4$, D$^4$, and E$^4$, as clearly shown in Fig. 4, which are connected with the separate compartments of B' by means of pipes 18$^c$, 18$^d$, and 18$^e$, provided with suitable shut-off valves. The final elements C$^4$, D$^4$, and E$^4$, are identical in construction, and consist of suitable basins provided with concentric walls 51, 52, and 53, see Fig. 5. Mounted within the inner compartment formed by wall 53, I provide the cylindrical sheet iron drum or tank 30$^a$ having closed tops as indicated at 54, see Fig. 5, and these tops 54 are provided with downwardly extending cylindrical partitions 36$^a$ and 37$^a$; the partitions being of different length, as clearly indicated in Fig. 5. The material is fed to the respective tanks by a feed pipe 55 which is centrally located and extends downwardly through the top 54; and the feed pipe 55 communicates with a conduit 18$^e$ whereby the material is fed from a compartment in the initial separator as clearly shown. In the construction illustrated, the tops 54 of the separating elements C$^4$, D$^4$, and E$^4$ are intended to loosely fit the top of the drums or tanks 30$^a$ so that the latter may revolve independent of the cover, and this I accomplish by means of the power shaft 57 which may have bearing in the feed pipe 55, with the lower end of the shaft secured to the bottom of the tank or drum 30$^a$ so that the latter will revolve with the shaft; the upper end of the shaft being provided with a suitable pulley or wheel as indicated at 58, which may receive a belt driven by any suitable source of power. The drums or cylindrical tanks 30$^a$ are provided with a suitable number of ports or openings near the upper portion thereof as indicated at 38$^a$. The covers 54 of the tanks or drums 30$^a$ are provided with outlets or conduits 39$^a$ and 40$^a$; the conduit 39$^a$ communicates with the interior of the tank 30$^a$ at a point intermediate of partitions 36$^a$ and 37$^a$ which depend from the cover 54, while the outer end of conduit 39$^a$ is adapted to discharge into the compartment formed by walls 51 and 52. The conduit 40$^a$ is connected with cover 54 so as to communicate with the interior of tank 30$^a$ at a point intermediate of feed pipe 55 and partition 36$^a$; while the outer or discharge end of conduit 40$^a$ discharges into the chamber intermediate of walls 52 and 53 of the outer basin. The conduits 39$^a$ and 40$^a$ are shown provided with suitable valves as at 59, 59, whereby the flow through the conduits may be controlled.

The units C$^4$, D$^4$, and E$^4$, are intended to treat different portions of the initially separated or disintegrated sewage and for that reason the different units are supplied through conduits communicating with different compartments of the initial separator B'. For example, the unit C$^4$, as illustrated in Fig. 4, is intended to treat the heavier particles of sewage which has been disintegrated and thrown into the outer compartment of tank B', namely the compartment formed by the outer wall of the tank and the partition 6'; the unit D$^4$ receiving the liquid or lighter portion of the disintegrated sewage by means of feed pipe or conduit 18$^d$ which communicates with the inner compartment of tank B' formed by the partition 7'; and the element or unit E$^4$ receives the disintegrated sewage of a specific gravity intermediate of that of the sewage conveyed to unit C$^4$ and D$^4$, which is done by the conduit 18$^e$ which, in this instance, communicates with the compartment of tank B' intermediate of concentric walls or partitions 6' and 7'. Each of the tanks or compartments formed by walls 51, 52, and 53, are preferably provided with outlets 60, 61, and 62, whereby the finally treated or disintegrated sewage may either be conveyed to the settling tanks or other portions of a sewage purification plant, or to any desired point.

It is evident that with a system as shown and described, a thorough disintegration or separation of sewage may be obtained through the action of centrifugal force induced primarily by the revolutions of gyrators or turbines and finally, preferably through the action of the revolving cylinders or drums, the revolution of the gyrators and drums being induced through the application of power from any suitable source.

I have shown and described what I believe to be the best forms of my invention, but it is apparent that the system may be modified in certain respects without, however, departing from the spirit of the invention; I do not wish to be understood, therefore, as limiting myself to the exact construction shown and described.

What I claim is:—

In a system for separating sewage, a basin provided with a series of concentrically arranged chambers, each of which is provided with a controllable discharge, a revolubly mounted closed tank placed within the inner chamber of the basin, said tank being provided with concentrically arranged partitions depending from the upper end of the tank, the successive partitions being of increasing depth from the tank center toward the sides thereof, an axially arranged conduit extending through the top of said tank and arranged to deliver the sewage to be treated concentrically at a point in proximity to the lower end of the innermost depending partition, and means whereby the upper end of each compartment intermediate of the depending partitions of the tank may be separately drained to a compartment of the basin.

JOHN P. BALL.

Witnesses:
S. V. McCarthy,
F. C. Jones.